Figure 1:
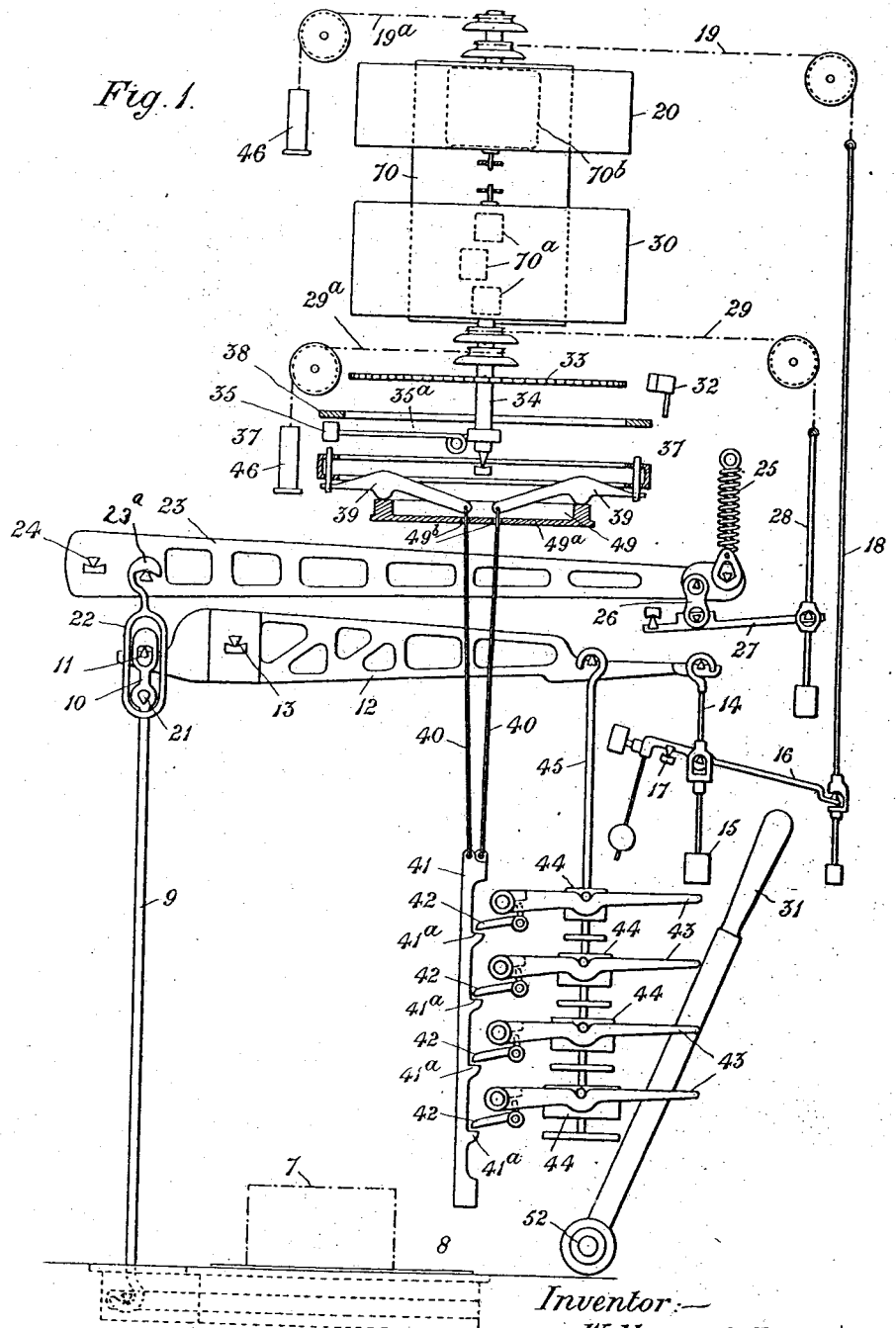

July 5, 1927.

W. A. BENTON 1,634,444

WEIGHING APPARATUS

Filed Aug. 11, 1924 2 Sheets-Sheet 1

Inventor:—
William A. Benton
by George E. Folkes.
his Attorney

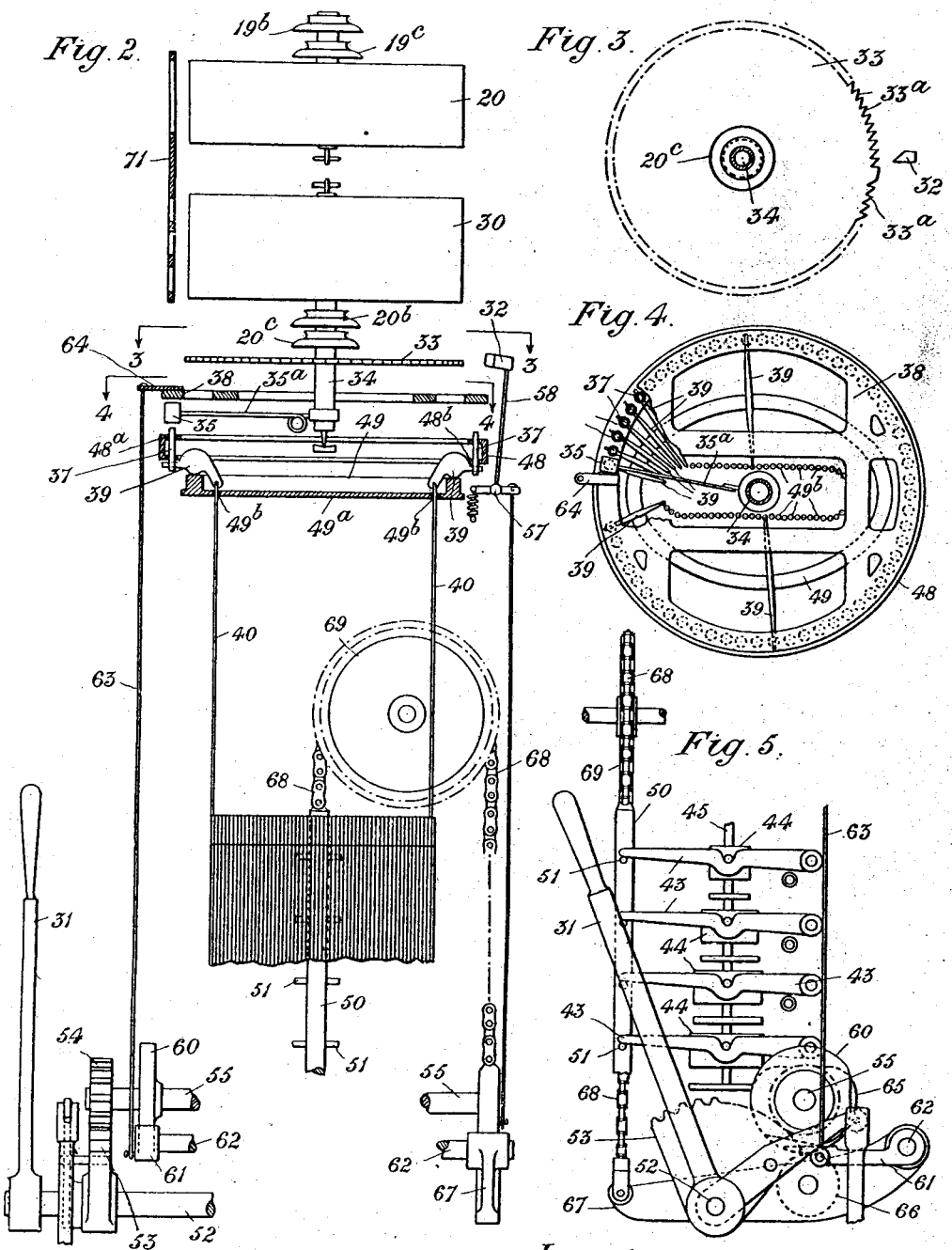

Patented July 5, 1927.

1,634,444

UNITED STATES PATENT OFFICE.

WILLIAM ALFRED BENTON, OF BIRMINGHAM, ENGLAND, ASSIGNOR TO W. & T. AVERY, LIMITED, OF BIRMINGHAM, ENGLAND.

WEIGHING APPARATUS.

Application filed August 11, 1924, Serial No. 731,466, and in Great Britain December 21, 1923.

This invention has reference to improvements in and connected with weighing apparatus and relates specifically to that type of weighing apparatus described and claimed in the specification of my prior Letters Patent No. 1,101,390 dated the 23rd day of June 1914.

In weighing apparatus of this character when the load exceeds a predetermined minimum a rough approximation of such a load is first determined by means of a suitable resistant and the indication of the load thus obtained automatically determines and selects one or more of a number of resistants which when placed in operative weighing connection with the machine exactly counterbalance the load as to the order of its major weight units, the remainder of the load as to the order of its minor weight units being simultaneously counterbalanced by a separate resistant. The placing of the selected resistants in operative weighing connection with the machine is effected by mechanical means which at the same time frees the apparatus from the interference of the rough weighing resistant hereinbefore referred to.

The present invention has for its objects improvements in the construction arrangement and operation of mechanism for weighing apparatus of this character whereby a machine suitable for effecting accurate weighments over a wide range is obtained.

The invention consists of a weighing apparatus of the kind referred to, wherein the selected resistants are controlled by a series of levers whose fulcra lie in the same horizontal plane, the selection of the requisite lever and the operation thereof being effected by means of a stud, hammer plate and locking plate disposed in horizontal planes, the invention further resides in the construction and operation of the levers referred to and in the arrangement and control of the selector mechanism operated by the hand lever, and in the arrangement and operation of the mechanism.

I will now describe the general arrangement and operation of the invention with particular reference to Figure 1 which is a diagrammatic representation of a weighing machine having a capacity of 30 tons constructed in accordance with my invention. In this machine the weighing resistant is divided into sixty parts one of which balances the load as to its minor order up to a maximum of one sixtieth of the capacity of the machine, that is, up to 10 cwts. the remainder of the load being counterbalanced by one or more of the 59 resistants the correct resistant or aggregate of resistants to counterbalance the load being automatically determined selected and brought into operation during the weighment.

Assuming the load to be less than 14½ cwt. on the application of the load 7 to the weighing platforms the connecting rod 9 is drawn downwardly and through the shackle 10 and knife-edge 11 rocks the main weighbeam 12 about its fulcrum 13 thereby raising the other end of the weighbeam 12 which through the rod 14 depending therefrom lifts the pendulous resistant 15, the weight of which is equivalent to 15 cwt. of load, from the overweighted lever 16 and permitting the said lever 16 to rock about its fulcrum 17 thereby raising the vertically balanced rod 18 and through the flexible connexion 19 rotating the indicating drum 20 the requisite amount.

If the load placed on the platform 8 be greater than 15 cwt. the resistant 15 is completely lifted off the lever 16 and the connecting rod 9 is drawn downwardly until a knife-edge projection 21 formed thereon bears against the lower end of a loop 22 the upper end of which bears on a knife-edge 23ª secured to a lever 23 and which latter on the application of a downward pull thereto rocks about the fulcrum 24 and extends a spring resistant 25. The lowering of the end of the lever 23 in connexion with the spring resistant 25 through a link 26 connected thereto permits of the rocking of a lever 27 which through a vertically balanced rod 28 in operative connection therewith and a flexible connexion 29 rotates the rough weighing indicator 30 the due amount and indicates thereon the measure of the load as to its major units. To effect an accurate weighment the hand lever 31 is now operated, the first movement of which causes a detent 32 to enter a notch 33ª in a notched or toothed plate 33 which is mounted on and rotates with a spindle 34 which also carries the rough weight indicator 30. This latter, however, may take the form of a vertical dial or segment, and be separately connected to the lever 27. The locking of the toothed plate 33 determines the setting of a spring-mounted selector stud 35 relative to one of a series of pins 37 which in turn control the operation of a resistant or aggregate of resistants which will exactly counterbalance the load indicated by the rough weight indicator. The continued operation of the lever 31 causes a hammer plate 38 to press on the head of the stud thereby depressing it, said stud in turn depressing the selected pin 37 which in turn rocks its respective lever 39 and through a wire 40 connected thereto lifts a stepped rod 41 which according to the number of projections 41ª it contains trips a number of pivotally mounted bell-crank levers 42. The continued and final movement of the lever 31 effects the placing of the determined series of resistants 44 on a rod 45 which depends from the power arm of the weighbeam 12 the tripping of the bell-cranks 42 permitting the respective levers 43 to fall sufficiently to deposit their weights 44 on the rod 45. The series of resistants selected by the rough weight determination is such that they are exactly proportionate to and counterbalance the number of units indicated by the rough weighing indicator the remaining amount of the load to obtain equilibrium being counterbalanced by the mechanism employed for effecting a determination of the minor part of the load.

The respective indicators 20 and 30 are returned to their zero position on the completion of a weighment by means of flexible connexions 19ª and 29ª which are oppositely wound about the respective spindles relative to the flexible connexions 19 and 29 the connexions 19ª and 29ª being connected to weights or pistons working in dashpots 46.

Referring now to Figures 2 to 5 of the accompanying sheets of drawing which illustrate in greater detail the improved construction and arrangement of a weighing machine in accordance with the present invention, Figure 2 is a diagrammatic part sectional end elevation of the weighing machine.

Figure 3 is a sectional plan on line 3—3 of Figure 2 limited to show the toothed plate and its locking detent.

Figure 4 a section of the resistant selector mechanism taken on the line 4—4 of Figure 2 part of the hammer plate being broken away the better to disclose the arrangement of the selector levers, and Figure 5 is a diagrammatic front elevation of the manually operable control lever and the mechanism actuated thereby.

The horizontal drum indicators 20 and 30 are each mounted on vertical spindles and as hereinbefore stated are operated by means of oppositely wound flexible connections 19, 19ª and 29, 29ª respectively, the said connexions being passed round drums 19ᵇ, 19ᶜ and 29ᵇ, 29ᶜ mounted on their respective spindles. The locking plate 33 is connected through the spindle 34 to the drum of the indicator 30, and since the locking plate 33 and arm 35ª are secured to the spindle 34 which carries the drum 30 they will rotate through equal arcs as the drum 30 when the latter is rotated.

The heads of the pins 37 are arranged in a circle below the selector stud 35 and directly below the circle traced by the stud in its rotation. These pins 37 are disposed and guided within apertures formed in the upper and lower rims 48ª, 48ᵇ of a double rimmed annulus 48 which is symmetrically disposed about the axis of the spindle 34. The pins 37 are forked at their lower ends and bestride the outer ends of the series of levers 39 which control the operation of the selected resistants. These levers 39 are of varying lengths and their fulcra are disposed in an ellipse symmetrical with the axis of the spindle 34 the bearings for the said fulcra being formed by an elliptical bearing plate 49. The outer ends of the levers 39, as will be inferred from the disposition of the pins 37, lie on a circle and owing to the varying lengths of the levers their inner ends lie on an ellipse. The inner ends of the levers 39 are connected to wires 40 which pass through apertures 49ᵇ formed in a plate 49ª which constitutes the base of the elliptical bearing plate 49 afore referred to, the other ends of these wires 40 being connected to rods 41 which are provided with steps 41ª the number of which varies with the resistant value of the respective rod 41. These rods 41 when raised by the rocking of their respective levers 39 trip the bell-cranked levers 42 and thus permit of the levers 43 to fall through a sufficient distance to admit of the resistant or aggregate of resistants 44 being deposited on the rod 45. To effect this operation the master weight rod 50 omitted in Figure 1 is lowered by the operation of the lever 31 in a manner about to be described and since the outer ends of the levers 43 normally rest on pins 51 mounted on the said rod 50 the levers 43 rock about their fulcra 43ª and those levers whose bell-cranks 42 have been tripped are permitted to fall a distance sufficient to deposit the selected resistants on the rod 45. This operation of the levers 43 will be clearly understood on reference to Figures 1 and 2 of the drawings.

The manually operable lever 31 for effecting the deposition of the resistants in the manner hereinbefore described is mounted on a shaft 52 which has keyed thereto a toothed segment 53 which meshes with a pinion 54 mounted on a shaft 55. This shaft 55 carries at one end thereof a crank (not shown) to the end of which is attached the lower end of a rod 56 which at its upper end is slidably mounted within an aperture in an arm of a lever 57 which carries a rod 58 to which the locking detent 32 is secured, a spring 59 normally in tension being attached to the other arm of the lever 57 to propel and lock the detent 32 within the selector notch 33ª in the plate 33 when the operation of the machine so requires. In the initial position the rod 56 maintains the detent 32 out of engagement with the toothed plate 33. Also mounted on the shaft 55 is a cam 60 which on the operation of the lever 31 and consequent counter-clockwise rotation of the pinion and shaft 55 bears against and depresses a lever 61 one end of which is pivotally mounted on a shaft 62 and thereby pulls downwardly a rod 63 which is secured at its upper end to a horizontal member 64 attached to the hammer plate 38 and thus effects the lowering of the hammer plate on the selector stud 35. The shaft 55 also carries a second cam 65 which, during the first stages of the operation of the lever 31, bears against the roller 66 mounted on a lever 67 which is pivotally mounted on the shaft 62 thereby maintaining the outer end of the lever 67 in its lowermost position. This outer end of the lever 67 is connected to one end of a chain 68 which passes over a chain wheel 69 and which is connected at its other end to the upper end of the master weight depositing rod 50 hereinbefore referred to. Thus when the lever 67 is depressed the rod 50 is maintained in its raised position and the ends of the levers 43 rest on the pins 51 and the weights 44 are thereby maintained free of the load rod 45 and also free of the bell-crank weight lever rests but the final movement of the lever 31 through the cam 65 permits the weight of the rod 50 through the chain 68 to overbalance and raise the lever 67 and this permissive lowering of the rod 50 admits of the levers 43 whose bell cranks 42 have been tripped to fall sufficiently to deposit their selected resistants on the load rod 45.

It will be seen that for loads above the capacity of the independent resistant 15 the indication of the load as to its major units is roughly determined by the spring resistant 25, the indication appearing at the respective aperture 70ª in the cover plate 70 the degree of rotation of the indicator necessary for this indication rotating the selector stud a like amount and thereby selecting a stud 37 which controls a resistant or aggregate of resistants sufficient to exactly counterbalance the load indicated by the dial 30. The operation of the lever 31 effects the transference of the selected resistant or aggregate of resistants to the load arm of the weighbeam 12 and in a manner that will be obvious from the operation of the machine as hereinbefore described frees the machine from the influence of the rough weighing resistant 25 the balance of the load as to its minor order being counterbalanced by the independent resistant 15 in the manner before referred to, the indication of such a load appearing at the aperture 70ᵇ formed in the cover plate 70. A mechanically or electrically operated shutter 71 is preferably embodied with the indicating mechanism, but the particular form of weight indicating does not form part of the present invention and is only diagrammatically illustrated for the purpose of an understanding of the working of the other parts of the mechanism.

Claims:—

1. In a weighing apparatus the combination of an automatic resistant for initially determining an approximation of the load, means for transmitting the load to said resistant, a weight indicator for indicating the measure of the load as to its major units, means connected to said resistant for effecting the actuation of the said indicator, a series of weights for counterbalancing the load as to its major order, means in operative connection with the aforesaid indicator for selecting the required weight for counterbalancing the major order of the load as determined by the indication recorded by the indicator, a series of levers having their fulcra disposed in a horizontal plane, a weighbeam, means actuated by the levers for depositing the required weights for counterbalancing the major order of the load on the weighbeam, and manually operable means acting through the aforesaid selecting means for controlling the operation of the said levers.

2. In a weighing apparatus the combination of an automatic resistant for initially determining the approximation of the load, means for transmitting the load to said resistant, a rotatable weight indicator for indicating the measure of the load as to its major units, means for effecting the rotation of the aforesaid indicator, a series of weights for counterbalancing the load as to its major order, a selector stud rotatable with the said indicator for determining the required weights for counterbalancing the major order of the load as determined by the indication recorded by the indicator, said studs being adapted to be rotated in a horizontal plane, a series of levers having their fulcra disposed in a horizontal plane, a weighbeam, means connection with said levers for effecting the deposition of the weights on said weighbeam, manually operable means acting through said stud for controlling the actuation of the said levers, and means for automatically counterbalancing the minor order of the load.

3. In a weighing apparatus the combination of an automatic resistant for initially determining the approximation of the load, means for transmitting the load to said resistant, a rotatable weight indicator for indicating the measure of the load as to its major units, means connected with said resistant for rotating the aforesaid indicator, a selective series of weights for counterbalancing the load as to its major order, a selector stud rotatable with the said indicator for determining the required weights for counterbalancing the major order of the load as determined by the indication recorded by the indicator said selector stud being adapted to be rotated in a horizontal plane, means for locking said selector stud in its determined position, a series of levers having their fulcra disposed in a horizontal plane, a weighbeam, means connected with said levers for effecting the deposition on the weighbeam of the required weights, a hammer plate adapted to cooperate with the selector stud for operating the levers controlling the required weights, manually operable means for controlling the action of the said hammer plate, and means for automatically counterbalancing the minor order of the load.

4. In a weighing apparatus the combination of an automatic resistant for initially determining the approximation of the load, means for transmitting the load to said resistant, a rotatable weight indicator for indicating the measure of the load as to its major units, means connected to said resistant for rotating said indicator, a selective series of weights for counterbalancing the load as to its major order, a horizontally disposed selector stud adapted to rotate with said indicator for determining the required weights for counterbalancing the major order of the load as determined by the indication recorded by the indicator, a horizontally disposed hammer plate, a series of levers having their fulcra disposed in a horizontal plane and adapted to control the deposition of the selected weight under the action of said hammer plate, means for locking the selector stud in its determined position relative to one of said levers for defining which of the levers is to be depressed by the hammer plate acting through said selector stud upon the operation of the said hammer plate, a weighbeam, means connected with said levers for effecting the deposition of the required weights on the weighbeam, manually operable means for controlling the operation of the said hammer plate, and means for automatically counterbalancing the minor order of the load.

5. In a weighing apparatus the combination of an automatic resistant for initially determining the approximation of the load, means for transmitting the load to said resistant, a rotatable weight indicator for indicating the measure of the load as to its major units, means connected to said resistant for rotating said weight indicator, a selective series of weights for counterbalancing the load as to its major order, a horizontally disposed selector stud adapted to rotate with said indicator for determining the required weights for counterbalancing the major order of the load as determined by the indication recorded by the indicator, a horizontally disposed hammer plate, a series of levers having their fulcra disposed in a horizontal plane and adapted to control the deposition of the selected weight under the action of said hammer plate, means for locking the selector stud in its determined position relative to one of said levers for defining which of the levers is to be depressed by the hammer plate acting through the said selector stud upon the operation of the said hammer plate, a weighbeam, means connected to said levers for effecting the required deposition on the weighbeam of the weights for counterbalancing the load as to its major order, manually operable means for successively effecting a locking of the selector stud and the depression of the hammer plate and the selected lever, and means for automatically counterbalancing the minor order of the load.

6. In a weighing apparatus, the combination of an automatic resistant for initially determining the approximation of the load, means for transmitting the load to said resistant, a rotatable weight indicator for indicating the measure of the load as to its major units, means connected to said resistant for rotating the said indicator, a selective series of weights for counterbalancing the load as to its major order, a horizontally disposed selector stud in operative connection with said resistant for determining the required weights for counterbalancing the major order of the load as determined by the indication recorded by the indicator, a horizontally disposed hammer plate, a series of levers having their fulcra disposed in a horizontal plane and adapted to control the deposition of the selected weight under the action of said hammer plate, means for locking the selector stud in its determined position relative to one of said levers for defining which of the levers is to be depressed by the hammer plate acting through the said selector stud upon the operation of the said hammer plate, a weighbeam, means connected with said levers for effecting the deposition on the weighbeam of the selected weights for counterbalancing the major order of the load, means operated by said hammer plate for effecting through said stud a rocking of said levers and thereby actuating the means for effecting the deposition of the selected weights, manually operable means for successively effecting a locking of the selector stud and a depression of the hammer plate, and means for automatically counterbalancing the minor order of the load.

7. In a weighing apparatus the combination of an automatic resistant for initially determining the approximation of the load, means for transmitting the load to said resistant, a weight indicator for indicating the measure of the load as to its major unit, means connected with the resistant for actuating the weight indicator, a selective series of weights for counterbalancing the load as to its major order, a horizontally disposed selector stud in operative connection with said resistant, said stud selecting the required weight for counterbalancing the major order of the load according to the indication of the weight indicator, a horizontally disposed hammer plate, a series of levers having their fulcra disposed in a horizontal plane and adapted to control the deposition of the selected weight under the action of said hammer plate, means for locking the selector stud in its determined position relative to one of said levers for defining which of the levers is to be depressed by the hammer plate acting through the said selector stud upon the operation of the said hammer plate, a weighbeam, means connected with said levers for effecting the deposition in the weighbeam of the selected weights, means operated by said hammer plate for effecting through said stud a rocking of the levers whereby the means connected therewith are actuated for effecting the deposition of the selected weights, means connected with the levers for depositing the weights on said weighbeam, manually operable means for successively effecting the locking of the selector stud and the depression of the hammer plate, and means for automatically counterbalancing the minor order of the load.

8. In a weighing apparatus, the combination of an automatic resistant for initially determining an approximation of the load, a weight indicator for indicating the measure of the load as to its major units, means connected with the resistant for actuating said weight indicator, a horizontally disposed selector stud in operative connection with the resistant for selecting the required weight for counterbalancing the major order of the load as determined by the weight indicator, a horizontally disposed hammer plate, a series of levers having their fulcra disposed in a horizontal plane and adapted to control the deposition of the selected weight under the action of said hammer plate, means for locking the selector stud in its determined position relative to one of said levers for defining which of the levers is to be depressed by the hammer plate acting through the said selector stud upon the operation of the said hammer plate, a weighbeam, means connected with said levers for effecting the deposition on the weighbeam of the required weights for counterbalancing the load as to its major order, means operated by said hammer plate for rocking said levers, manually operable means for successively effecting a locking of the selector stud and depression of the hammer plate, and means for automatically counterbalancing the minor order of the load.

In testimony whereof, I have signed my name to this specification.

WILLIAM ALFRED BENTON.